USO11884109B2

(12) United States Patent
Yoshida

(10) Patent No.: US 11,884,109 B2
(45) Date of Patent: Jan. 30, 2024

(54) PNEUMATIC TIRE

(71) Applicant: The Yokohama Rubber Co., LTD., Tokyo (JP)

(72) Inventor: Hiroyuki Yoshida, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 452 days.

(21) Appl. No.: 16/912,550

(22) Filed: Jun. 25, 2020

(65) Prior Publication Data

US 2020/0406686 A1 Dec. 31, 2020

(30) Foreign Application Priority Data

Jun. 28, 2019 (JP) .................................. 2019-121683

(51) Int. Cl.
| B60C 11/03 | (2006.01) |
|---|---|
| B60C 11/13 | (2006.01) |
| B60C 11/11 | (2006.01) |

(52) U.S. Cl.
CPC .......... B60C 11/1369 (2013.01); B60C 11/11 (2013.01); *B60C 2011/0346* (2013.01); *B60C 2011/0367* (2013.01); *B60C 2011/0381* (2013.01)

(58) Field of Classification Search
CPC ................. B60C 11/1369; B60C 11/11; B60C 2011/0369; B60C 2011/0381; B60C 2011/0383

See application file for complete search history.

(56) References Cited

U.S. PATENT DOCUMENTS

| 9,597,929 | B2 | 3/2017 | Takahashi | |
|---|---|---|---|---|
| 10,391,819 | B2 | 8/2019 | Kageyama | |
| 2010/0059157 | A1 | 3/2010 | Ashton et al. | |
| 2020/0369090 | A1* | 11/2020 | Sakamoto | ........... B60C 11/1369 |

FOREIGN PATENT DOCUMENTS

| JP | 05-169922 | * | 7/1993 |
|---|---|---|---|
| JP | 08-104112 | * | 4/1996 |
| JP | H8-156524 | A | 6/1996 |
| JP | 10-278513 | * | 10/1998 |
| JP | 2004-224268 | * | 8/2004 |
| JP | 2013-006515 | A | 1/2013 |
| JP | 2015-227114 | | 12/2015 |
| JP | 2016-007861 | A | 1/2016 |
| JP | 2016-088219 | A | 5/2016 |
| JP | 2018-095035 | A | 6/2018 |
| WO | WO 2019155786 | * | 8/2019 |

OTHER PUBLICATIONS

English machine translation of JP10-278513. (Year: 1998).*
Decision to Grant a Patent received from Japanese Patent office, dated Feb. 13, 2023, for Corresponding Japanese Application No. JP 2019-121683.

* cited by examiner

*Primary Examiner* — Robert C Dye
(74) *Attorney, Agent, or Firm* — Thorpe North & Western

(57) ABSTRACT

In a pneumatic tire, a pair of first center blocks and two or more second center blocks are alternately arranged in the tire circumferential direction to form a block row of a center land portion. Additionally, the block row of the center land portion is obtained by coupling in a row in the tire circumferential direction and in a zigzag shape via coupling grooves each including a groove bottom portion shallower than first and second inclined lug grooves.

14 Claims, 8 Drawing Sheets

| | CONVENTIONAL EXAMPLE 1 | CONVENTIONAL EXAMPLE 2 | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|---|---|
| PRESENCE OF COUPLING GROOVE | NO | YES | YES | YES | YES | YES | YES | YES | YES | YES |
| BLOCK COUPLING STRUCTURE | - | LATTICE SHAPE | ZIGZAG | ZIGZAG | ZIGZAG | ZIGZAG | ZIGZAG | ZIGZAG | ZIGZAG | ZIGZAG |
| $\phi1$ [deg.] | 90 | 90 | 90 | 70 | 61 | 47 | 61 | 61 | 61 | 61 |
| $\phi2$ [deg.] | 90 | 90 | 90 | 30 | 42 | 42 | 56 | 42 | 42 | 42 |
| $\phi1-\phi2$ [deg.] | 0 | 0 | 0 | 40 | 19 | 5 | 5 | 19 | 19 | 19 |
| Hb/H1 | - | 0.50 | 0.50 | 0.50 | 0.50 | 0.50 | 0.50 | 0.72 | 0.77 | 0.85 |
| SNOW PERFORMANCE | 100 | 95 | 98 | 98 | 98 | 98 | 98 | 101 | 102 | 104 |
| WEAR RESISTANCE PERFORMANCE | 100 | 104 | 103 | 104 | 105 | 106 | 106 | 105 | 105 | 104 |
| UNEVEN WEAR RESISTANCE PERFORMANCE | 100 | 103 | 102 | 103 | 104 | 105 | 105 | 104 | 104 | 103 |

FIG. 8

PNEUMATIC TIRE

RELATED APPLICATION

This application is based upon and claims the benefit of priority from Japanese Patent Application No. 2019-121683, filed Jun. 28, 2019, the entire contents of which is incorporated herein by reference.

TECHNICAL FIELD

The technology relates to a pneumatic tire and particularly relates to a pneumatic tire that can provide improved wear resistance performance while maintaining snow performance.

BACKGROUND ART

Conventional off-road tires include a plurality of inclined lug grooves formed on a tread surface and each having a groove depth equivalent to that of a main groove in order to ensure appropriate traction characteristics during running on a snowy road. The technology described in Japan Unexamined Patent Publication No. 2015-227114 is a conventional pneumatic tire that is configured in this manner.

SUMMARY

The technology provides a pneumatic tire that can provide improved wear resistance performance while maintaining snow performance.

An embodiment of the technology provides a pneumatic tire including: first and second circumferential main grooves extending in a tire circumferential direction; and a pair of shoulder land portions and one row of a center land portion defined by the first and second circumferential main grooves, the center land portion including: first and second inclined lug grooves extending at an incline with respect to the tire circumferential direction; a pair of first center blocks defined by the first and second inclined lug grooves and disposed adjacent in a tire lateral direction; and two or more second center blocks defined by the first and second inclined lug grooves and disposed adjacent in the tire lateral direction, the pair of first center blocks and the two or more second center blocks being alternately arranged in the tire circumferential direction to form a block row of the center land portion, and the block row of the center land portion being obtained by coupling in a row in the tire circumferential direction and in a zigzag shape via coupling grooves each including a groove bottom portion shallower than the first and second inclined lug grooves.

In the pneumatic tire according to an embodiment of the technology, the block row of the center land portion is obtained by coupling in a row in the tire circumferential direction and in a zigzag shape via the coupling grooves each including the shallow groove bottom portion. Thus, compared to a configuration in which all adjacent center blocks are coupled together, the pneumatic tire provides improved traction characteristics on snowy road surfaces. This has the advantage of the tire snow performance being improved. Additionally, compared to a configuration in which all adjacent center blocks are defined by deep grooves, the pneumatic tire advantageously ensures the rigidity of the blocks to improve the wear resistance performance of the tire.

BRIEF DESCRIPTION OF DRAWINGS

FIG. 8 is a table showing the results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Pneumatic Tire

Figure 1:
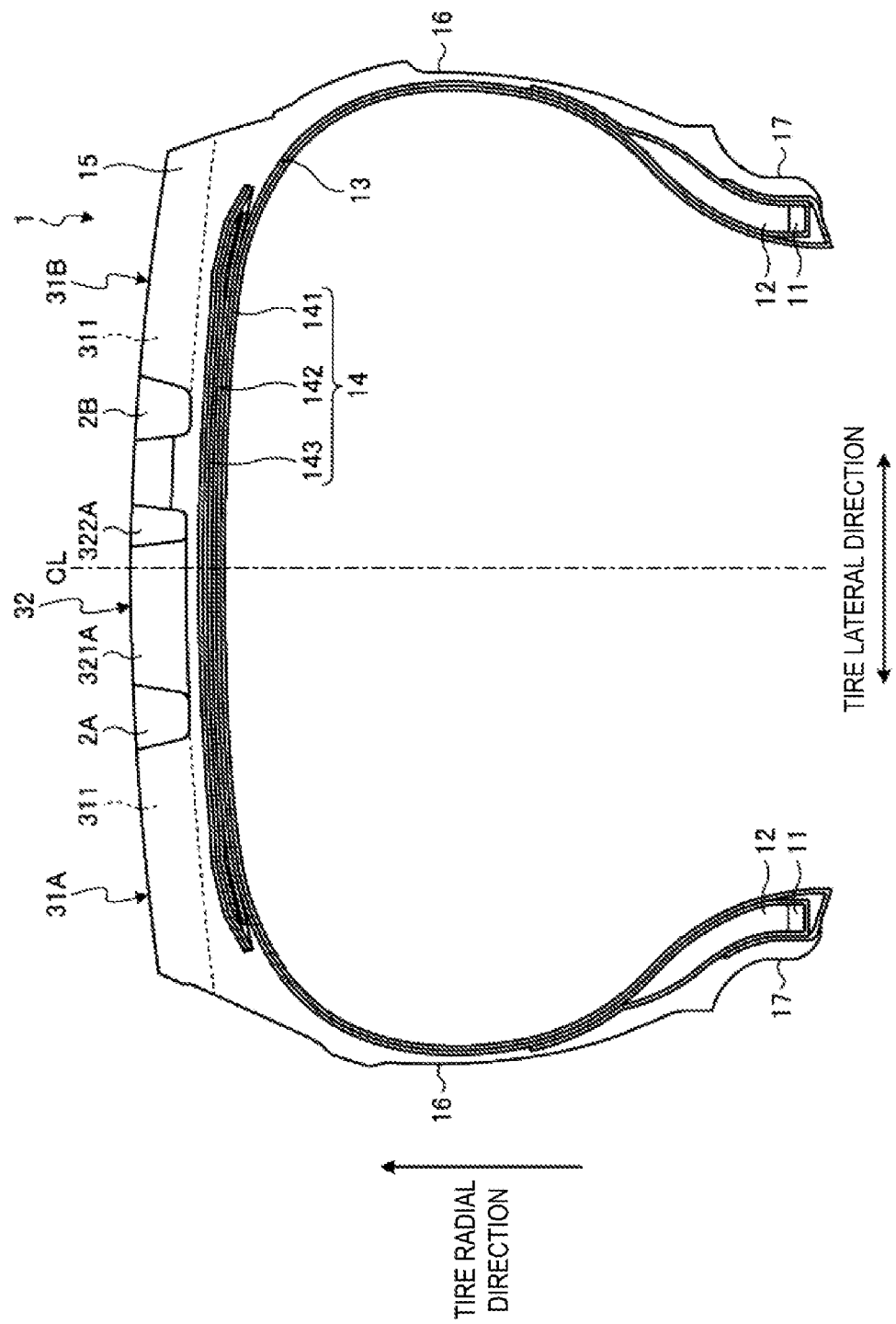
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in a tire radial direction. Additionally, the same drawing illustrates a radial tire for a light truck as an example of a pneumatic tire.

In reference to the same drawing, a cross-section in a tire meridian direction is defined as a cross-section of the tire taken along a plane that includes a tire rotation axis (not illustrated). Additionally, a tire equatorial plane CL is defined as a plane extending perpendicularly to the tire rotation axis through the midpoint of measurement points of a tire cross-sectional width defined by JATMA (The Japan Automobile Tyre Manufacturers Association, Inc.). Additionally, a tire lateral direction is defined as the direction parallel with the tire rotation axis. The tire radial direction is defined as the direction perpendicular to the tire rotation axis.

A pneumatic tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 are formed by winding one or a plurality of bead wires made of steel in an annular shape and in multiple layers and are embedded in respective bead portions to form cores of the left and right bead portions. The pair of bead fillers 12, 12 are disposed outward of the pair of bead cores 11, 11 in the tire radial direction and reinforce the bead portions.

The carcass layer 13 has a single layer structure made of one carcass ply or a multilayer structure made of a plurality of carcass plies and extends between the left and right bead cores 11, 11 in a toroidal shape, forming the framework of the tire. Additionally, both end portions of the carcass layer 13 are turned back outward in the tire lateral direction so as to wrap around the bead cores 11 and the bead fillers 12 and fixed. Additionally, carcass plies in the carcass layer 13 are made by performing a rolling process on coating rubber-covered carcass cords made of steel or an organic fiber material (e.g. aramid, nylon, polyester, rayon, or the like). Each of the carcass plies has a cord angle (defined as the inclination angle, in the longitudinal direction, of the carcass cords with respect to the tire circumferential direction) of 80 deg. or more and 100 deg. or less.

The belt layer 14 is a multilayer structure including a plurality of belt plies 141 to 143 and is disposed by being wound around the outer circumference of the carcass layer 13. The belt plies 141 to 143 include a pair of cross belts 141, 142 and a belt cover 143.

The pair of cross belts 141, 142 are made by performing a rolling process on coating rubber-covered belt cords made of steel or an organic fiber material. Each of the cross belts 141, 142 has a cord angle of 15 deg. or more and 55 deg. or less as absolute values. Additionally, the pair of cross belts 141, 142 have cord angles (defined as inclination angles, in the longitudinal direction, of the belt cords with respect to the tire circumferential direction) of opposite signs and are layered such that the longitudinal directions the belt cords intersect each other (what is called a crossply structure). Additionally, the pair of cross belts 141, 142 are disposed layered outward of the carcass layer 13 in the tire radial direction.

The belt cover 143 is made by coating belt cover cords made of steel or an organic fiber material with coating rubber. The belt cover 143 has a cord angle of 0 deg. or more and 10 deg. or less as absolute values. Additionally, the belt cover 143 is, for example, a strip material formed by coating one or a plurality of belt cover cords with coating rubber and winding the strip material spirally around the outer circumferential surface of the cross belts 141, 142 a plurality of times in the tire circumferential direction. Additionally, the belt cover 143 is disposed covering the entire areas of the cross belts 141, 142.

The tread rubber 15 is disposed outward of the carcass layer 13 and the belt layer 14 in the tire radial direction and constitutes a tread portion. The pair of sidewall rubbers 16, 16 are disposed outward of the carcass layer 13 in the tire lateral direction and constitute left and right sidewall portions. Each of the pair of rim cushion rubbers 17, 17 extends, from an inner side of a corresponding one of the left and right bead cores 11, 11 and a turned back portion of the carcass layer 13 in the tire radial direction, outward in the tire width direction, forming a rim engaging surface of the bead portion.

Tread Pattern

Figure 2:
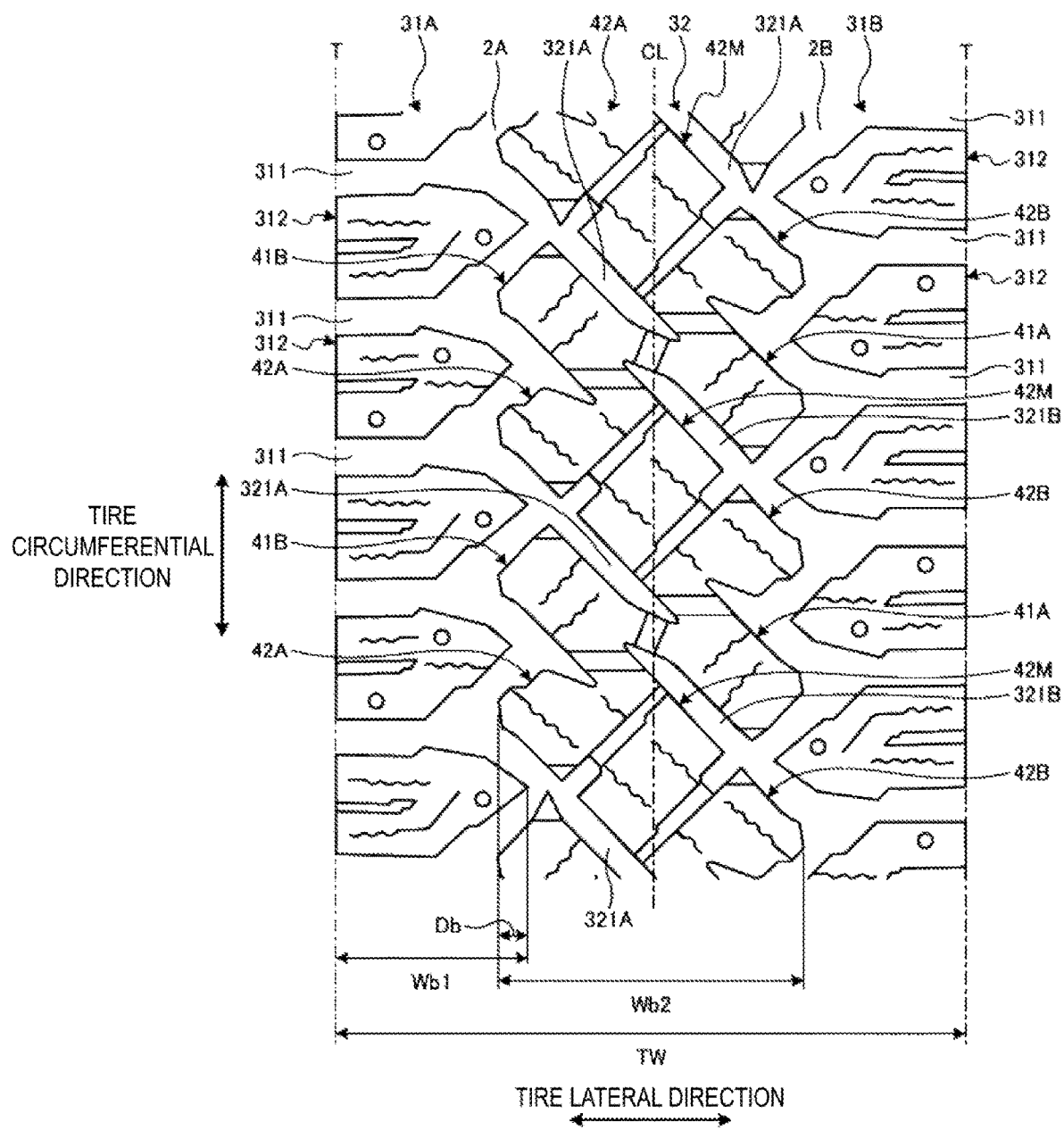
FIG. 2 is a plan view illustrating a tread surface of the pneumatic tire illustrated in FIG. 1.

FIG. 2 is a plan view illustrating a tread surface of the pneumatic tire illustrated in FIG. 1. The same drawing illustrates a tread surface of an off-road tire. In reference to the same drawing, "tire circumferential direction" refers to the direction revolving about the tire rotation axis. A reference sign T denotes a tire ground contact edge, and a dimensional sign TW denotes a tire ground contact width.

As illustrated in FIG. 2, the pneumatic tire 1 includes, in a tread surface, a pair of circumferential main grooves 2A, 2B; and a pair of shoulder land portions 31A, 31B and one row of a center land portion 32 defined by the circumferential main grooves 2A, 2B.

Each of the circumferential main grooves 2A, 2B has a zigzag shape with an amplitude in the tire lateral direction. Additionally, each of the circumferential main grooves 2A, 2B is obliged to include a wear indicator specified by JATMA and typically has a groove width of 7.0 mm or more and a groove depth of 8.5 mm or more.

The groove width is measured as a distance between opposing groove walls at a groove opening portion with the tire mounted on a specified rim and inflated to a specified internal pressure and in an unloaded state. In a configuration including a notch portion or a chamfered portion at the groove opening portion, the groove width is measured using, as measurement points, intersection points between an extension line of a tread contact surface and extension line of the groove walls, in a cross-sectional view parallel to a groove width direction and a groove depth direction.

The groove depth is measured as a distance from the tread contact surface to a maximum groove depth position with the tire mounted on a specified rim and inflated to the specified internal pressure and in an unloaded state. Additionally, in a configuration in which a partial recess/protrusion portion and a sipe at the groove bottom, the groove depth is measured by excluding these portions.

"Specified rim" refers to a "standard rim" defined by JATMA, a "Design Rim" defined by TRA (The Tire and Rim Association, Inc., or a "Measuring Rim" defined by ETRTO (The European Tyre and Rim Technical Organisation). Additionally, "specified internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in JATMA, for a passenger vehicle tire, the specified internal pressure is an air pressure of 180 kPa, and the specified load is 88% of the maximum load capacity at the specified internal pressure.

Additionally, in the configuration in FIG. 2, the pneumatic tire 1 has a substantially point-symmetric tread pattern with a center point on the tire equatorial plane CL. However, no such limitation is intended, and the pneumatic tire 1 may have a point-asymmetric tread pattern (not illustrated).

Additionally, in FIG. 2, a maximum ground contact width Wb1 of each of the shoulder land portion 31A, 31B with respect to the tire ground contact width TW is preferably in the range of $0.50 \le Wb1/TW \le 0.80$ and more preferably in the range of $0.55 \le Wb1/TW \le 0.70$.

Additionally, a maximum ground contact width Wb2 of the center land portion 32 with respect to the tire ground contact width TW is preferably in the range of $0.30 \le Wb2/TW \le 0.60$ and more preferably in the range of $0.40 \le Wb2/TW \le 0.50$.

The ground contact width of a land portion is measured as a linear distance in the tire axial direction on a contact surface between the land portion and a flat plate, with the tire mounted on a specified rim, inflated to the specified internal pressure, and placed perpendicularly to the flat plate in a stationary state and loaded with a load corresponding to the specified load.

The tire ground contact width TW is measured as a linear distance in the tire axial direction on a contact surface between the tire and a flat plate, with the tire mounted on a specified rim, inflated to the specified internal pressure, and placed perpendicularly to the flat plate in a stationary state and loaded with a load corresponding to the specified load.

The tire ground contact edge T is defined as the maximum width position in the tire axial direction of the contact surface between the tire and a flat plate, with the tire mounted on a specified rim, inflated to the specified internal pressure, and placed perpendicularly to the flat plate in a stationary state and added with a load corresponding to the specified load.

Additionally, as illustrated in FIG. 2, the pair of shoulder land portions 31A, 31B and the center land portion 32 are disposed overlapping each other as viewed in the tire circumferential direction. Accordingly, the circumferential main grooves 2A, 2B have a see-through-less structure as viewed in the tire circumferential direction.

Additionally, an overlapping amount Db between each of the shoulder land portions 31A; 31B and the center land portion 32 has a relationship with the tire ground contact width TW represented by $0 \leq Db/TW \leq 0.10$.

The overlapping amount Db of each of the land portions 31A, 31B, 32 is measured as a distance in the tire lateral direction between the measurement points of the maximum ground contact widths Wb1, Wb2 of the land portion 31A, 31B, 32.

Shoulder Land Portions

As illustrated in FIG. 2, each of the shoulder land portions 31A, 31B includes a plurality of shoulder lug grooves 311 and a plurality of shoulder blocks 312 defined by the shoulder lug grooves 311.

Each of the shoulder lug grooves 311 extends in the tire lateral direction, opens, at one end portion, to the circumferential main groove 2A; 2B, and opens, at the other end portion, to the tire ground contact edge T. Additionally, the plurality of the shoulder lug grooves 311 are arranged at predetermined intervals in the tire circumferential direction. In addition, each of the shoulder lug grooves 311 has a groove width of 13 mm or more and a groove depth of 8.0 mm or more. The groove depth of the shoulder lug groove 311 with respect to the groove depth of the circumferential main groove 2A is in the range of 80% or more and 100% or less. Additionally, in the configuration in FIG. 2, the shoulder lug grooves 311 are disposed, the number of which is the same as the pitch number of the zigzag shape of the circumferential main grooves 2A, and each of the shoulder lug grooves 311 opens at a maximum amplitude position of the circumferential main groove 2A; 2B outward in the tire lateral direction.

The shoulder block 312 has a convex edge portion protruding toward the tire equatorial plane CL along the zigzag shape of the circumferential main groove 2A; 2B. Additionally, the plurality of shoulder blocks 312 are arranged at predetermined intervals in the tire circumferential direction to form a single block row. Additionally, in the configuration of FIG. 2, the shoulder blocks 312 are formed, the number of which is the same as the pitch number of the zigzag shape of the circumferential main grooves 2A. Additionally, each of the shoulder blocks 312 includes: a semi-closed lug groove (reference sign omitted in drawings) that opens, at one end portion, to the tire ground contact edge T and that terminates, at the other end portion, within the shoulder block 312; a plurality of sipes (reference sign omitted in drawings); and pin holes (reference sign is omitted in the drawings) into which studless pins are inserted.

Center Land Portion

Figure 3:
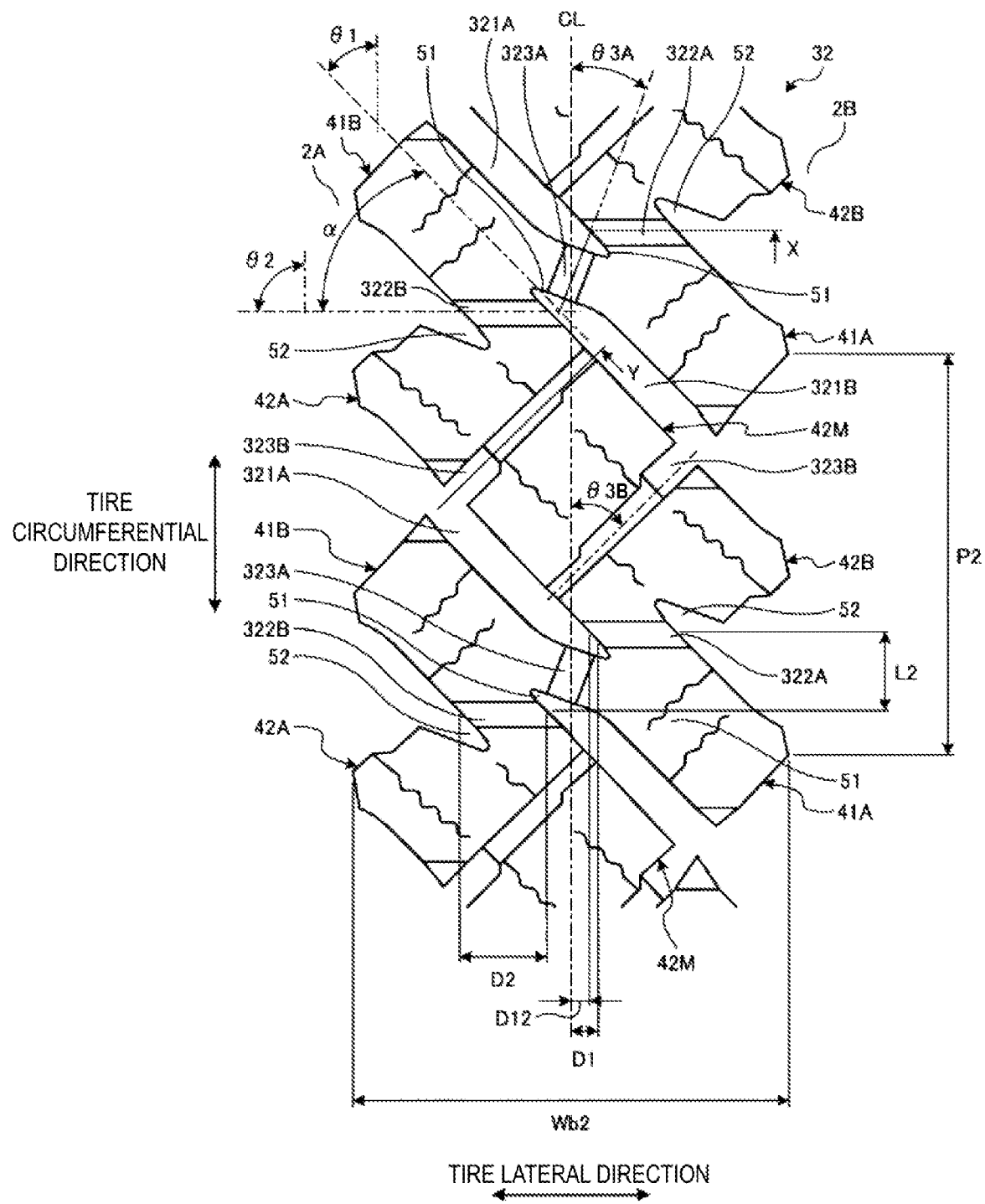
FIG. 3 is an enlarged view illustrating a center land portion illustrated in FIG. 2.
Figure 4:
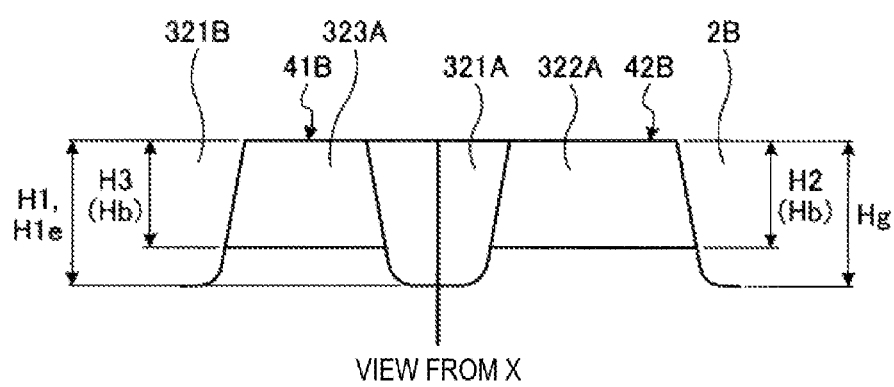
FIG. 4 is a cross-sectional view of the center land portion taken along line X-X in FIG. 3.
Figure 5:
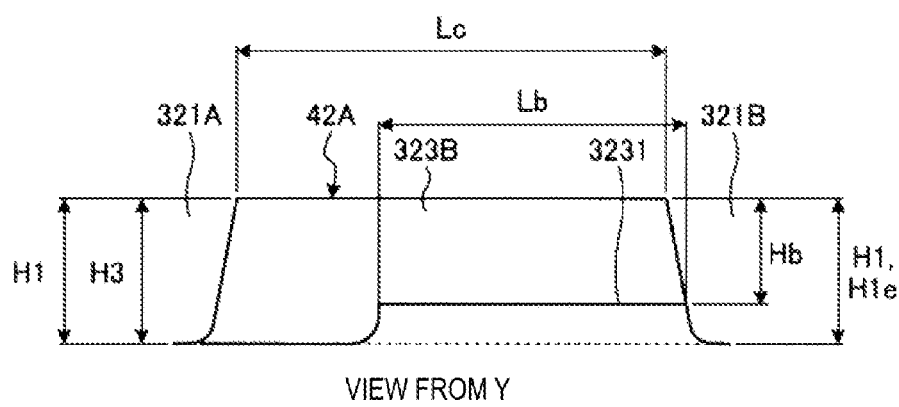
FIG. 5 is a cross-sectional view of the center land portion taken along line Y-Y in FIG. 3.

FIG. 3 is an enlarged view illustrating the center land portion illustrated in FIG. 2. FIGS. 4 and 5 are a cross-sectional view from X (FIG. 4) and a cross-sectional view from Y (FIG. 5) of the center land portion illustrated in FIG. 3.

As illustrated in FIG. 3, the center land portion 32 includes: first and second inclined lug grooves 321A, 321B; first and second lateral grooves 322A, 322B; first and second auxiliary grooves 323A, 323B; and a plurality of center blocks 41A, 41B, 42A, 42B defined by the grooves.

As illustrated in FIG. 2, each of the first inclined lug grooves 321A extends at an incline with respect to the tire circumferential direction and intersects the tire equatorial plane CL. Additionally, the first inclined lug groove 321A opens, at one end portion, to the first circumferential main groove 2A and terminates, at the other end portion, within the center land portion 32. The each of second inclined lug grooves 321B extends at an incline in the same direction as the first inclined lug grooves 321A and intersects the tire equatorial plane CL. Additionally, each of the second inclined lug grooves 321B opens, at one end portion, to the second circumferential main groove 2B and terminates, at the other end portion, within the center land portion 32. Accordingly, the first and second inclined lug grooves 321A, 321B are inclined in the same direction with respect to the tire circumferential direction and open to the different circumferential main grooves 2A, 2B.

Additionally, each of the first and second inclined lug grooves 321A, 321B has a groove width of 5.0 mm or more and a groove depth of 8.0 mm or more. In the configuration in FIG. 3, the first and second inclined lug grooves 321A, 321B are main grooves and, as illustrated in FIG. 4, have substantially the same maximum groove depth as that of the circumferential main grooves 2A, 2B. Specifically, a groove depth H1 of the inclined lug groove 321A; 321B over the entire area from the opening portion at the circumferential main groove 2A; 2B to the terminating end portion in the center land portion 32 has a relationship with a maximum groove depth Hg of the circumferential main groove 2A, 2B represented by $0.80 \leq H1/Hg \leq 1.00$ and more preferably by $0.90 \leq H1/Hg \leq 1.00$. Thus, each of the inclined lug grooves 321A, 321B is defined as a continuous groove portion having the groove depth H1 described above, and the terminating end portion is defined as the end portion of the above-described groove portion in the center land portion 32.

In the configuration described above, each of the inclined lug grooves 321A, 321B terminates within the center land portion 32 without extending through the center land portion 32. Thus, compared to a configuration in which the inclined lug groove extends through the center land portion (not illustrated), this configuration provides an increased snow column shear force during traveling on a snowy road. Thus, the traction characteristics of the tire are improved, and the snow performance of the tire is improved. Additionally, the rigidity of the center blocks 41A to 42B is increased to improve the wear resistance performance of the tire.

Additionally, in FIG. 3, an inclination angle θ1 of each of the first and second inclined lug grooves 321A, 321B in the tire equatorial plane CL is preferably in the range of 25 deg.$\leq$θ1$\leq$70 deg. and more preferably in the range of 30 deg.$\leq$θ1$\leq$50 deg.

The inclination angle θ1 of the inclined lug groove is measured as an angle between the groove center line of the inclined lug groove and the tire equatorial plane CL.

For example, in the configuration in FIG. 3, the first and second inclined lug grooves 321A, 321B are main grooves and each have a groove depth equivalent to that of each of the circumferential main grooves 2A, 2B. In addition, both the first and second inclined lug grooves 321A, 321B extend from the first and second circumferential main grooves 2A, 2B to a position where the inclined lug grooves intersect the tire equatorial plane CL. Additionally, the inclined lug groove 321A; 321B includes a widened portion (reference sign is omitted in drawings) between the terminating end portion of the inclined lug groove and the tire equatorial plane CL.

Additionally, in FIG. 3, a distance D1 from the tire equatorial plane CL to the terminating end portion of each of the first and second inclined lug grooves 321A, 321B has a relationship with the tire ground contact width TW represented by $0 \leq D1/TW \leq 0.20$. Thus, the terminating end portions of the inclined lug grooves 321A, 321B are appropriately positioned, improving the tire traction characteristics of the tire.

In the configuration illustrated in FIG. 3, both the first and second inclined lug grooves 321A, 321B extend in the tire lateral direction beyond the tire equatorial plane CL, and thus overlap each other. However, no such limitation is intended, and one or both of the inclined lug grooves 321A, 321B may terminate without intersecting the tire equatorial plane CL (not illustrated).

The inclined lug grooves 321A, 321B may terminate without overlapping each other as viewed in the tire circumferential direction or in the tire lateral direction (not illustrated).

The first lateral groove 322A connects the first inclined lug groove 321A with the second circumferential main groove 2B. The second lateral groove 322B connects the second inclined lug groove 321B with the first circumferential main groove 2A. Additionally, the single lateral groove 322A; 322B opens with respect to the set of the inclined lug groove 321A; 321B and the circumferential main groove 2A; 2B.

Additionally, each of the first and second lateral grooves 322A, 322B has a groove width of 4.0 mm or more and 20 mm or less and a groove depth of 6.0 mm or more and 17 mm or less. In the configuration of FIG. 3, as illustrated in FIG. 4, each of the first and second lateral grooves 322A, 322B has a smaller groove width and a smaller groove depth than each of the circumferential main grooves 2A, 2B and each of the inclined lug grooves 321A, 321B. Additionally, a maximum groove depth H2 of the lateral groove 322A; 322B preferably has a relationship with a groove depth H1$e$ at the terminating end portion of the inclined lug groove 321A; 321B represented by $0.70 \leq H2/H1e \leq 0.90$ and more preferably by $0.75 \leq H2/H1e \leq 0.85$.

In the configuration described above, the maximum groove depth H2 of the lateral groove 322A; 322B is shallower than the groove depth H1$e$ of the terminating end portion of the inclined lug groove 321A; 321B, thus ensuring an effect that holds back a flow path (that is, the lateral groove 322A; 322B) from the inclined lug groove 321A; 321B to the circumferential main groove 2A; 2B. Accordingly, the terminating end portion of the inclined lug groove 321A; 321B has an increased snow column shear force, further improving the snow performance of the tire. Additionally, a raised bottom effect of the lateral groove 322A; 322B increases the rigidity of the center blocks 41A to 42B, improving the wear resistance performance of the tire.

Additionally, an inclination angle θ2 of each of the first and second lateral grooves 322A, 322B with respect to the tire circumferential direction is preferably in the range of 80 deg.$\leq$θ2$\leq$120 deg. and more preferably in the range of 85 deg.$\leq$θ2$\leq$100 deg. Thus, the first and second lateral grooves 322A, 322B are substantially orthogonal to the tire circumferential direction.

The inclination angle θ2 of the lateral groove 322A; 322B is measured as an angle formed between the tire circumferential direction and a straight line extending through the left and right opening portions of inclined lug groove 321A; 321B and the circumferential main groove 2A; 2B.

Additionally, in FIG. 3, a crossing angle α of each of the first and second lateral grooves 322A; 322B with respect to the corresponding one of the first and second inclined lug grooves 321A; 321B is preferably in the range of 30 deg.$\leq$α$\leq$75 deg. and more preferably in the range of 40 deg.$\leq$α$\leq$60 deg.

The crossing angle α is measured as an angle formed between an extension line of the groove center line of the lateral groove 322A; 322B and the groove center line of the inclined lug groove 321A; 321B.

In the configuration described above, the lateral groove 322A; 322B connecting the circumferential main groove 2A; 2B with the inclined lug groove 321A; 321B opens laterally at an angle of 30 deg. or more relative to the inclined lug groove 321A; 321B. Thus, a groove unit from the inclined lug groove 321A; 321B to the circumferential main groove 2A; 2B via the lateral groove 322A; 322B has an L- or T-bent shape. Thus, the terminating end portion of the inclined lug groove 321A; 321B has an increased snow column shear force, improving the traction characteristics of the tire.

In FIG. 3, a distance D12 to the tire equatorial plane CL from the intersection point between the groove center line of each of the first and second inclined lug grooves 321A; 321B and the groove center line of the corresponding one of the first and second lateral grooves 322A; 322B preferably has a relationship with the tire ground contact width TW (see FIG. 2) represented by $0 \leq D12/TW \leq 0.20$. For example, in the configuration of FIG. 3, the lateral grooves 322A; 322B are connected to the inclined lug grooves 321A; 321B in the region between the terminating end portions of the inclined lug grooves 321A; 321B and the tire equatorial plane CL.

The opening position of the lateral grooves 322A; 322B is defined as the midpoint of the measurement points of the opening width of the first and second lateral grooves 322A; 322B with respect to the inclined lug grooves 321A; 321B.

In FIG. 3, an extension length D2 of each of the first and second lateral grooves 322A, 322B in the tire lateral direction has a relationship with a maximum ground contact width Wb2 of the center land portion 32 represented by $0.10 \leq D2/Wb2 \leq 0.30$.

Additionally, in FIG. 3, a distance L2, in the tire circumferential direction, of the opening position of each of the first and second lateral grooves 322A; 322B with respect to the corresponding one of the first and second inclined lug grooves 321A; 321B preferably has a relationship with a pitch length P2 of the center block 41A represented by $0 \leq L2/P2 \leq 0.30$. Each of the first and second auxiliary grooves 323A, 323B connects the first inclined lug grooves 321A with the second inclined lug grooves 321B, which are adjacent to each other. Additionally, the first and second auxiliary grooves 323A, 323B are disposed alternately in the tire circumferential direction.

Figure 7:
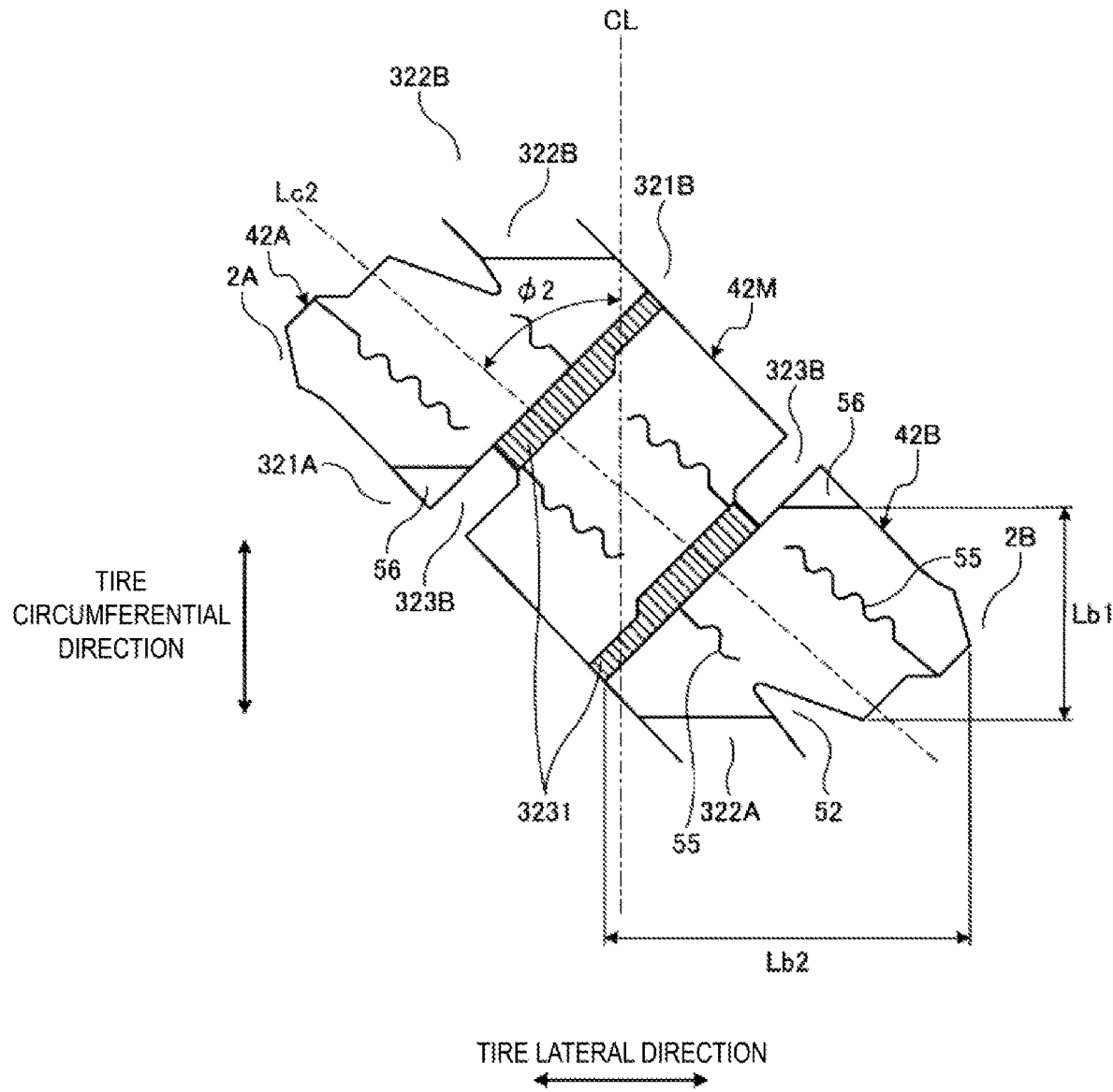
FIG. 7 is an explanatory diagram illustrating second center blocks of the center land portion illustrated in FIG. 3.

Additionally, each of the first and second auxiliary grooves 323A, 323B has a groove width of 2.0 mm or more and 23 mm or less and a groove depth of 6.0 mm or more and 17 mm or less. In the configuration in FIG. 3, the first and second auxiliary grooves 323A, 323B have substantially the same maximum groove depth H3 (see FIG. 4) with respect to the circumferential main grooves 2A, 2B and the inclined lug grooves 321A, 321B (see FIG. 4). Specifically, the maximum groove depth H3 of each of the first and second auxiliary grooves 323A, 323B has a relationship with the groove depth H1 (see FIG. 4) of each of the first and second inclined lug grooves 321A, 321B represented by $0.80 \le H3/H1 \le 1.00$. Additionally, as illustrated in FIG. 7 described below, each of the first and second auxiliary grooves 323A, 323B includes a raised bottom portion 3231. Additionally, a minimum distance Hb (see FIG. 4) from the tread contact surface to a top surface of the raised bottom portion 3231 has a relationship with the maximum groove depth H1 of each of the first inclined lug grooves 321A, 321B represented by $0.75 \le Hb/H1 \le 0.85$.

In addition, inclination angles $\theta3A$, $\theta3B$ of the first and second auxiliary grooves 323A, 323B are preferably in the range of 10 deg. $\le \theta3A \le 30$ deg. and 30 deg. $\le \theta3B \le 85$ deg. and more preferably in the range of 15 deg. $\le \theta3A \le 25$ deg. and 40 deg. $\le \theta3B \le 80$ deg. Additionally, the inclination angle $\theta3A$ of the first auxiliary groove 323A with respect to the tire circumferential direction is smaller than the inclination angle $\theta3B$ of the second auxiliary groove 323B. Specifically, a difference between the inclination angles $\theta3A$ and $\theta3B$ is preferably in the range of 15 deg. $\le \theta3A - \theta3B$.

The inclination angles $\theta3A$, $\theta3B$ of the auxiliary grooves 323A, 323B are measured as angles formed between the tire circumferential direction and a straight line extending through the left and right opening portions of the inclined lug grooves 321A; 321B.

For example, in the configuration in FIG. 3, the first and second auxiliary grooves 323A, 323B are disposed on the tire equatorial plane CL and define the center blocks 41A to 42B. Additionally, each of the first auxiliary grooves 323A defines the first center blocks 41A, 41B, described below, and each of the second auxiliary grooves 323B defines the second center blocks 42A, 42B, described below. Additionally, the first and second auxiliary grooves 323A, 323B have different inclination angles $\theta3A$, $\theta3B$ and are inclined in the same direction with respect to the tire circumferential direction.

Center Block

Figure 6:
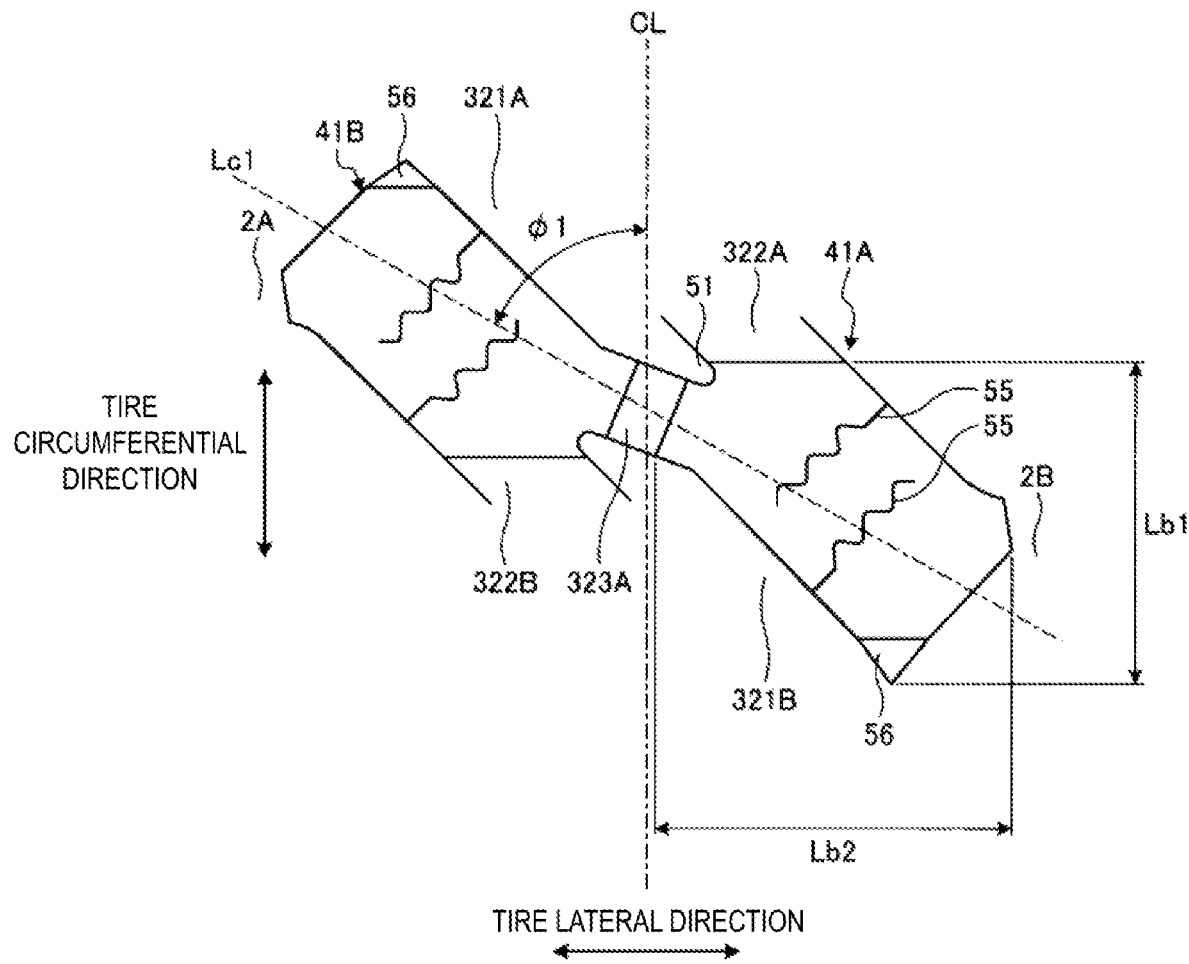
FIG. 6 is an explanatory diagram illustrating first center blocks of the center land portion illustrated in FIG. 3.

FIGS. 6 and 7 are explanatory diagrams illustrating center blocks of the center land portion illustrated in FIG. 3. In these drawings, FIG. 6 illustrates a pair of first center blocks 41A, 41B, and FIG. 7 illustrates a pair of center blocks 42A, 42B.

As illustrated in FIG. 2, the center blocks 41A, 41B, 42A, 42B are defined into the grooves described above, that is, the first and second circumferential main grooves 2A, the first and second inclined lug grooves 321A, 321B, the first and second lateral grooves 322A, 322B, and the first and second auxiliary grooves 323A, 323B.

Here, of the plurality of center blocks 41A, 41B, 42A, 42B, the center blocks 41A, 41B disposed on an extension line of the groove center lines of the first and second inclined lug grooves 321A, 321B are defined as first center blocks. Additionally, center blocks 42A, 42M, 42B disposed between the first and second inclined lug grooves 321A, 321B are defined as second center blocks. In the configuration of FIG. 2, the pair of center blocks 41A, 41B are defined as first center blocks, and the three center blocks 42A, 42M, 42B are defined as second center blocks.

In the configuration in FIG. 2, block units (reference sign omitted in drawings) each including a set of the pair of first center blocks 41A, 41B and the three center blocks 42A, 42M, 42B are arranged repeatedly in the tire circumferential direction to form a block row of the center land portion 32. Additionally, as illustrated in FIG. 3, the first center block 41A and the second center block 42B, located on the right side of FIG. 3, are disposed in a row in the tire circumferential direction with edge portions on the first circumferential main groove 2A side aligned with each other. In addition, the first center block 41B and the second center block 42A, located on the left side of FIG. 3, are disposed in a row in the tire circumferential direction along the second circumferential main groove 2B with edge portions on the tire lateral direction outer side aligned with each other. Additionally, the left and right first center blocks 41A, 41B are disposed offset from each other in the tire circumferential direction, and the left and right second center blocks 42A, 42B are disposed offset from each other in the tire circumferential direction.

Note that, in the configuration in FIG. 2, one block unit includes the pair of first center blocks 41A, 41B and the three second center blocks 42A, 42M, 42B as described above. However, no such limitation is intended, and one block unit may include a pair of first center blocks and a pair of second center blocks (not illustrated). Even in this case, the first center blocks and the second center blocks are alternately arranged in the tire circumferential direction to form a block row of the center land portion 32.

Additionally, in the configuration in FIG. 3, each of the first and second lateral grooves 322A, 322B has the inclination angle $\theta2$ substantially orthogonal to the tire circumferential direction as described above. Thus, the center blocks 41A to 42B defined by the lateral grooves 322A, 322B include respective edge portions substantially orthogonal to the tire circumferential direction. This provides edge components of the center blocks 41A to 42B, improving the snow performance of the tire.

Additionally, in FIGS. 5 and 6, a maximum length Lb1 of the center blocks 41A to 42B in the tire circumferential direction and a maximum width Lb2 of the center blocks 41A to 42B in the tire lateral direction have a relationship of $0.70 \le Lb2/Lb1 \le 1.10$. In addition, the maximum length Lb1 of the center blocks 41A to 42B preferably has a relationship with the pitch length P2 (see FIG. 3) of the center block 41A represented by $0.40 \le Lb1/P2 \le 0.70$. Additionally, the maximum width Lb2 of the center blocks 41A to 42B preferably has a relationship with the tire ground contact width TW (see FIG. 2) represented by $0.10 \le Lb2/TW \le 0.50$ and more preferably by $0.20 \le Lb2/TW \le 0.40$.

The maximum length Lb1 and the maximum width Lb2 of the center blocks 41A to 42B are measured on the contact surface between the land portion and a flat plate, with the tire mounted on a specified rim, inflated to the specified internal pressure, and placed perpendicularly to the flat plate in a stationary state and loaded with a load corresponding to the specified load.

Coupling Structure for Center Block

In reference to FIG. 2, as described above, the center land portion 32 includes the pair of first center blocks 41A, 41B and two or more second center blocks 42A, 42M, 42B. Additionally, the first center blocks 41A, 41B and the second center blocks 42A, 42M, 42B are alternately arranged in the tire circumferential direction to form a block row of the center land portion 32.

Additionally, as illustrated in FIG. 2, the block row of the center land portion 32 is obtained by coupling in a row in the tire circumferential direction and in a zigzag shape via coupling grooves. The above-described coupling grooves include the first and second lateral grooves 322A, 322B and the first and second auxiliary grooves 323A, 323B as illustrated in FIG. 3.

Specifically, the pair of first center blocks 41A, 41B are coupled together in the tire lateral direction via the first auxiliary groove 323A, and the three second blocks 42A, 42M, 42B are coupled together in the tire lateral direction via the second auxiliary groove 323B. Additionally, the first center block 41B defined by the first circumferential main groove 2A is coupled to the second center block 42A defined by the first circumferential main groove 2A, in the tire circumferential direction via the second lateral groove 322B. Thus, the five center blocks 41A, 41B, 42A, 42M, 42B are coupled together in a row and in a U shape to form one block unit (reference sign omitted in drawings).

Additionally, the second center block 42B defined by the second circumferential main groove 2B forming one block unit is coupled to the first center block 41A defined by the second circumferential main groove 2B forming another block unit, in the tire circumferential direction via the first lateral groove 322A. Thus, the adjacent block units are coupled together. Additionally, a plurality of block units are coupled together in a row over the entire circumference of the tire to form a block row of the center land portion 32. On the other hand, the center blocks 41A to 42B are not coupled together at any other positions.

Additionally, as illustrated in FIG. 3, the first and second lateral grooves 322A, 322B coupling the first center blocks 41A, 41B to the second center blocks 42A, 42M, 42B are disposed at different positions in the tire lateral direction. Thus, the block row of the center land portion 32 as a whole is obtained by coupling in a row in the tire circumferential direction and in a zigzag shape. Additionally, in the configuration in FIG. 3, the first and second lateral grooves 322A, 322B are respectively disposed in a left and a right regions bounded by the tire equatorial plane CL.

Additionally, in the configuration in FIG. 3, an imaginary line Lc1 (see FIG. 6) extending through a center of gravity of the first center blocks 41A, 41B in a tread plan view and an imaginary line Lc2 (see FIG. 7) extending through a center of gravity of the second center blocks 42A, 42M, 42B in the tread plan view are inclined in the same direction with respect to the tire circumferential direction. In addition, an inclination angle $\varphi 1$ of the imaginary line Lc1 of the first center blocks 41A, 41B and an inclination angle $\varphi 2$ of the imaginary line Lc2 of the second center blocks 42A, 42M, 42B, with respect to the tire circumferential direction, are preferably in the ranges of 15 deg.$\leq \varphi 1 \leq$ 65 deg. and 15 deg.$\leq \varphi 2 \leq$ 65 deg. and more preferably in the ranges of 18 deg.$\leq \varphi 1 \leq$ 61 deg. and 18 deg.$\leq \varphi 2 \leq$ 61 deg.

The imaginary lines Lc1, Lc2 are defined as straight lines extending, in a tread plan view, through the center of gravity of each of the contour lines of the first and second center blocks 41A, 41B; 42A, 42M, 42B. Additionally, in a case where the center of gravity of three or more of the second center blocks 42A, 42M, 42B is not present like a single straight line, the imaginary line Lc2 is defined as a straight line extending through the center of gravity of the left and right second center blocks 42A, 42B defined by the first and second circumferential main grooves 2A, 2B.

Additionally, the inclination angle $\varphi 1$ of the imaginary line Lc1 of the pair of first center blocks 41A, 41B is preferably larger than the inclination angle $\varphi 2$ of the imaginary line Lc2 of two or more of the second center blocks 42A, 42M, 42B ($\varphi 2 \leq \varphi 1$) (see FIGS. 3, 6 and 7). Specifically, the difference between the inclination angle $\varphi 1$ of the imaginary line Lc1 and the inclination angle $\varphi 2$ of the imaginary line Lc2 is preferably in the range of 5 deg.$\leq \varphi 1 - \varphi 2 \leq$ 30 deg. and more preferably 8 deg.$\leq \varphi 1 - \varphi 2 \leq$ 20 deg.

Additionally, each of the coupling grooves (322A, 322B, 323A, 323B) includes a groove bottom portion shallower than the first and second inclined lug grooves 321A, 321B. Specifically, the minimum distance Hb (see FIGS. 4 and 5) from the tread contact surface to the groove bottom portion of the coupling groove has a relationship with the maximum groove depth H1 of the first inclined lug grooves 321A, 321B represented by $0.70 \leq Hb/H1 \leq 0.90$.

The minimum distance Hb to the groove bottom portion is measured with the tire mounted on a specified rim and inflated to the specified internal pressure and in an unloaded state and in a configuration including a raised bottom portion in the groove bottom, measured using the top surface of the raised bottom portion as a measurement point.

In the above-described configuration, the block row of the center land portion 32 is obtained by coupling in a row in the tire circumferential direction and in a zigzag shape via the coupling grooves each including the shallow groove bottom portion. Thus, (1) compared to a configuration in which all adjacent center blocks are coupled together, the pneumatic tire provides improved traction characteristics on snowy road surfaces. This has the advantage of the tire snow performance being improved. Additionally, (2) compared to a configuration in which all adjacent center blocks are defined by deep grooves, the pneumatic tire ensures the rigidity of the blocks to improve the wear resistance performance and uneven wear resistance performance of the tire.

For example, in the configuration in FIG. 4, the first and second lateral grooves 322A, 322B have a constant groove depth, and the maximum groove depth H2 of the first and second lateral grooves 322A, 322B is equal to the minimum distance Hb from the tread contact surface to the groove bottom portion. Additionally, the maximum groove depth H2 (=Hb) of the first and second lateral grooves 322A, 322B has a relationship with the maximum groove depth H1 of the first and second inclined lug grooves 321A, 321B represented by $0.70 \leq H2/H1 \leq 0.90$. However, no such limitation is intended, and the lateral grooves 322A, 322B may each include a partial raised bottom portion, like the second auxiliary groove 323B described below (not illustrated).

Additionally, in the configuration in FIG. 4, the first auxiliary groove 323A has a constant groove depth, and the maximum groove depth H3 of the first auxiliary groove is equal to the minimum distance Hb from the tread contact surface to the groove bottom portion. Additionally, the maximum groove depth H3 (=Hb) of the first auxiliary groove 323A has a relationship with the maximum groove depth H1 of the first and second inclined lug grooves 321A, 321B represented by $0.70 \leq H3/H1 \leq 0.90$. However, no such limitation is intended, and the first auxiliary groove 323A may include a partial raised bottom portion, like the second auxiliary groove 323B described below (not illustrated).

Additionally, in the configuration in FIG. 5, the second auxiliary groove 323B includes the partial raised bottom portion 3231, and thus the minimum distance Hb from the tread contact surface to the groove bottom portion is measured using the top surface of the raised bottom portion 3231 as a measurement point. The minimum distance Hb has a relationship with the maximum groove depth H1 of the first inclined lug grooves 321A, 321B represented by $0.70 \leq Hb/H1 \leq 0.90$.

In addition, as illustrated in FIG. 5, in a configuration in which the coupling groove (second auxiliary groove 323B) includes a partial raised bottom portion 3231 that satisfies conditions for the minimum distance Hb described above, a length Lb of the raised bottom portion 3231 preferably has a relationship with a groove length Lc of the coupling groove represented by $0.50 \leq Lb/Lc$.

The length Lc of the coupling groove and the length Lb of the raised bottom portion 3231 are measured as path lengths along the longitudinal direction of the coupling groove.

Additionally, as illustrated in FIGS. 6 and 7, the center blocks 41A to 42B include first and second notch portions 51, 52, through sipes, a pair of narrow grooves, a plurality of closed sipes 55, and chamfered portions 56.

The first notch portion 51 is a groove-shaped recess portion opening in the block road contact surface. The first notch portion 51 is formed in an edge portion of the first center block 41A, 41B and opens to a terminating end portion of the first or second inclined lug groove 321A, 321B.

The second notch portion 52 is a groove-shaped recess portion that opens in the block road contact surface. The second notch portion 52 is formed at an edge portion of the second center block 42A, 42B and opens to the first or second circumferential main groove 2A, 2B.

The through sipes 53 extend through the center blocks 41A to 42B and open at left and right edge portions of the center blocks 41A to 42B.

The narrow grooves 54A; 54B extend along the through sipes 53. Each narrow groove 54A; 54B opens, at one end portion, to an edge portion of a corresponding one of the center blocks 41A to 42B and terminates, at the other end portion, within the corresponding one of the center blocks 41A to 42B. Additionally, a maximum groove depth Hs (not illustrated) of each narrow groove 54A, 54B has a relationship with the groove depth Hg of each circumferential main groove 2A, 2B (see FIG. 4) represented by $0.60 \leq Hs/Hg \leq 0.90$.

Note that instead of the narrow grooves 54A, 54B, chamfered portions or what is called chamfered sipes may be formed that extend along the through sipes 53 and that open to the road contact surfaces of the center blocks 41A to 42B (not illustrated).

The closed sipes 55 terminate within the center blocks 41A to 42B. Additionally, a plurality of the closed sipes 55 are each disposed in one of the left and right regions of the center blocks 41A to 42B defined by the through sipes 53.

The sipes are cuts formed in the tread contact surface and each have a sipe width of less than 1.5 mm and a sipe depth of 2.0 mm or more. Thus, the sipes close when the tire comes into contact with the ground.

The sipe width is measured as the maximum opening width of the sipe on the tread contact surface, with the tire mounted on a specified rim and inflated to the specified internal pressure and in an unloaded state.

The sipe depth is measured as a distance from the tread contact surface to the maximum depth position of the sipe, with the tire is mounted on a specified rim and inflated to the specified internal pressure and in an unloaded state. Additionally, in a configuration in which a sipe partially includes a recess/protrusion portion on the groove bottom, the sipe depth is measured excluding this portion.

The chamfered portions 56 are formed in corner portions, in the tire circumferential direction, of the center blocks 41A, 41B, 42A, 42B defined by the circumferential main grooves 2A, 2B. More specifically, the chamfered portion 56 is formed in each of the corner portions of the center blocks 41B, 42A; 41A, 42B facing connecting portions between the circumferential main grooves 2A; 2B and the inclined lug grooves 321A; 321B. Thus, heel and toe wear of the center blocks 41A, 41B, 42A, 42B is suppressed.

Effects

As described above, the pneumatic tire 1 includes the first and second circumferential main grooves 2A, 2B extending in the tire circumferential direction, and the pair of shoulder land portions 31A, 31B and the one row of the center land portion 32 defined by the first and second circumferential main grooves 2A, 2B (see FIG. 2). Additionally, the center land portion 32 includes: the first and second inclined lug grooves 321A, 321B extending inclined with respect to the tire circumferential direction; the pair of first center blocks 41A, 41B defined by the first and second inclined lug grooves 321A, 321B and disposed adjacent in the tire lateral direction; and the two or more second center blocks 42A, 42M, 42B defined by the first and second inclined lug grooves 321A, 321B and disposed adjacent in the tire lateral direction. Additionally, the pair of first center blocks 41A, 41B and the two or more second center blocks 42A, 42M, 42B are alternately arranged in the tire circumferential direction to form the block row of the center land portions 32. In addition, the block row of the center land portion 32 is obtained by coupling in a row in the tire circumferential direction and in a zigzag shape via the coupling grooves (grooves 322A, 322B, 323A, 323B in FIG. 3) each including a groove bottom portion shallower than the first and second inclined lug grooves 321A, 321B.

In such a configuration, the block row of the center land portion 32 is obtained by coupling in a row in the tire circumferential direction and in a zigzag shape via the coupling grooves each including the shallow groove bottom portion. Thus, (1) compared to a configuration in which all adjacent center blocks are coupled together, the pneumatic tire provides improved traction characteristics on snowy road surfaces. This has the advantage of the tire snow performance being improved. Additionally, (2) compared to a configuration in which all adjacent center blocks are defined by deep grooves, the pneumatic tire ensures the rigidity of the blocks to improve the wear resistance performance and uneven wear resistance performance of the tire.

Additionally, in the pneumatic tire 1, the imaginary line Lc1 extending through the center of gravity of the first center blocks 41A, 41B and the imaginary line Lc2 extending through the center of gravity of the second center blocks 42A, 42M, 42B are inclined in the same direction with respect to the tire circumferential direction (see FIGS. 6 and 7). Such a configuration, compared to a configuration in which the imaginary lines Lc1, Lc2 are inclined in opposite directions (not illustrated), efficiently increases the rigidity of the center blocks 41A, 41B, 42A, 42M, 42B coupled together in a zigzag shape. This has the advantage that the wear resistance and uneven wear resistance of the tire are improved.

Additionally, in the pneumatic tire 1, the inclination angle φ1 of the imaginary line Lc1 of the first center blocks 41A, 41B and the inclination angle φ2 of the imaginary line Lc2 of the second center blocks 42A, 42M, 42B, with respect to the tire circumferential direction, are in the ranges of 15 deg.$\leq \varphi 1 \leq$65 deg. and 15 deg.$\leq \varphi 2 \leq$65 deg. (see FIG. 6 and FIG. 7). This has the advantage that the center blocks 41A to 42B are appropriately arranged.

Additionally, in the pneumatic tire 1, the inclination angle φ1 of the imaginary line Lc1 and the inclination angle φ2 of the imaginary line Lc2 have a relationship of $\varphi 2 \leq \varphi 1$ and 5 deg.$\leq \varphi 1 - \varphi 2 \leq$30 deg. (see FIGS. 3, 6 and 7). This has the advantage that the center blocks 41A to 42B are appropriately arranged.

Additionally, in the pneumatic tire 1, the minimum distance Hb from the tread contact surface to the groove bottom portion of each of the coupling grooves (grooves 322A, 322B, 323A, 323B in FIG. 3) has a relationship with the maximum groove depth H1 of the first and second inclined lug grooves 321A, 321B represented by $0.70 \leq Hb/H1 \leq 0.90$ (see FIGS. 4 and 5). Advantageously, the lower limit described above ensures the appropriate depth of each coupling groove, ensuring the traction characteristics of the tire. Advantageously, the upper limit described above ensures the effect of the coupling grooves coupling the center blocks 41A to 42B together, ensuring the rigidity of the center blocks.

Additionally, in the pneumatic tire 1, each of the coupling grooves (grooves 322A, 322B, 323A, 323B in FIG. 3) includes the partial raised bottom portion 3231 that satisfies the conditions for the minimum distance Hb described above (see FIG. 5), and the length Lb of the raised bottom portion 3231 has a relationship with the groove length Lc of the coupling groove represented by $0.50 \leq Lb/Lc$. This has the advantage of ensuring the effect of the coupling grooves coupling the center blocks 41A to 42B together.

Additionally, in the pneumatic tire 1, the pair of first center blocks 41A, 41B are coupled together via a first coupling groove (first auxiliary groove 323A) of the above-described coupling grooves, the two or more second center blocks 42A, 42M, 42B are coupled together via a second coupling groove (second auxiliary groove 323B) of the above-described coupling grooves, and the first center block 41B included in the first center blocks 41A, 41B and defined by the first circumferential main groove 2A is coupled, via a third coupling groove (lateral groove 322B) of the above-described coupling grooves, to the second center block 42A included in the second center blocks 42A, 42M, 42B and defined by the first circumferential main groove 2A, forming a block unit (see FIG. 3). Additionally, the second center block 42B that is included in the second center blocks 42A, 42M, 42B forming one block unit and that is defined by the second circumferential main groove 2B is coupled, via a fourth coupling groove (lateral groove 322A) of the above-described coupling grooves, to the first center block 41A that is included in the pair of first center blocks 41A, 41B forming another block unit and that is defined by the second circumferential main groove 2B, coupling the adjacent block units together. Thus, the block row is formed in which the blocks are coupled together in a row in the tire circumferential direction and in a zigzag shape.

Additionally, in the pneumatic tire 1, the maximum groove depth H1 of the first (and second) inclined lug groove 321A (321B) has a relationship with the maximum groove depth Hg of the first (and second) circumferential main groove 2A, 2B represented by $0.80 \leq H1/Hg \leq 1.00$ (see FIG. 4). This has the advantage of ensuring the maximum groove depth H1 of the inclined lug groove 321A (321B), thus ensuring the traction characteristics of the tire.

Additionally, in the pneumatic tire 1, the first inclined lug groove 321A opens, at one end portion, to the first circumferential main groove 2A and terminates, at the other end portion, within the center land portion 32, and the second inclined lug groove 321B extends at an incline in the same direction as the first inclined lug grooves 321A and opens, at one end portion, to the second circumferential main groove 2B and terminates, at the other end portion, within the center land portion 32 (see FIG. 2). In addition, the coupling grooves include: the first lateral groove 322A connecting the first inclined lug groove 321A with the second circumferential main groove 2B; the second lateral groove 322B connecting the second inclined lug groove 321B with the first circumferential main groove 2A; and the first and second auxiliary grooves 323A, 323B connecting the first inclined lug groove 321A with the second inclined lug groove 321B adjacent to each other. Additionally, the first inclined lug groove 321A and the first lateral groove 322A, and the second inclined lug groove 321B and the second lateral groove 322B are alternately arranged in the tire circumferential direction to define the first center blocks 41A, 41B and the second center blocks 42A, 42M, 42B. Additionally, the first auxiliary groove 323A defines the pair of first center blocks 41A, 41B, and the second auxiliary groove 323B defines the two or more second center blocks 42A, 42M, 42B. This has the advantage of appropriately configuring the grooves and blocks of the center land portion 32.

Additionally, in the pneumatic tire 1, the plurality of center blocks 41A to 42B include the pair of first center blocks 41A, 41B disposed adjacent in the tire lateral direction and the two or more second center blocks 42A, 42B disposed adjacent in the tire lateral direction, the first center blocks 41A, 41B and the second center blocks 42A, 42B being alternately arranged in the tire circumferential direction (see FIG. 3). Additionally, the pair of first center blocks 41A; 41B are disposed on the extension line of the first and second inclined lug grooves 321A; 321B. Thus, advantageously, the center blocks 41A to 42B are appropriately disposed with respect to the inclined lug grooves 321A, 321B, improving the snow performance of the tire.

Additionally, in the pneumatic tire 1A, the inclination angle θ2 of the first (and second) lateral groove 322A (322B) with respect to the tire circumferential direction is in the range of 80 deg.$\leq θ2 \leq 120$ deg. (see FIG. 3). In such a configuration, advantageously, the lateral groove 322A (322B) is substantially orthogonal to the tire circumferential direction, advantageously improving the traction characteristics of the tire.

Additionally, in the pneumatic tire 1, the inclination angles θ3A, θ3B (see FIG. 3) of the first and second auxiliary grooves 323A, 323B are in the ranges of 10 deg.$\leq θ3A \leq 30$ deg. and 30 deg.$\leq θ3B \leq 85$ deg. The above-described lower limit advantageously ensures the rigidity of the center blocks 41A to 42B, and the above-described upper limit advantageously ensures the traction characteristics of the tire.

Additionally, in the pneumatic tire 1, the maximum width Lb2 (see FIGS. 6 and 7) of the first (and second) center blocks 41A, 41B (42A, 42B) have a relationship with the tire ground contact width TW of the center land portion 32 represented by $0.10 \leq Lb2/TW \leq 0.50$. Advantageously, the above-described lower limit appropriately ensures the maximum width Lb2 of the center blocks 41A, 41B (42A, 42B), suppressing uneven wear of the blocks. In addition, advantageously, the above-described upper limit suppresses a reduction in groove area ratio caused by an excessive amount of blocks, ensuring the snow performance of the tire.

Additionally, in the pneumatic tire 1, the maximum ground contact width Wb2 of the center land portion 32 with respect to the tire ground contact width TW is in the range of $0.30 \leq Wb2/TW \leq 0.60$ (see FIG. 2). This has the advantage of appropriately setting the width Wb2 of the center land portion 32.

Additionally, in the pneumatic tire 1, the first and second circumferential main grooves 2A, 2B each have a zigzag shape with an amplitude in the tire lateral direction (see FIG. 2). Additionally, the pair of shoulder land portions 31A, 31B and the center land portion 32 are disposed overlapping each other in the tire circumferential direction. This has the advantage of ensuring traction characteristics on mud roads, thus ensuring the snow performance of the tire.

Example

FIG. 8 is a table showing results of performance tests of pneumatic tires according to embodiments of the technology.

In the performance tests, a plurality of different test tires were evaluated for (1) snow performance, (2) wear resistance performance, and (3) uneven wear resistance performance. Additionally, a test tire having a tire size of LT265/70R17 121Q is assembled on a rim having a rim size of 17×8 J, and the test tire is inflated to an internal pressure of 450 kPa and loaded with a load specified by JATMA. Additionally, the test tires are mounted on all wheels of an LT pickup vehicle used as a test vehicle.

(1) In the evaluation of snow performance, the test vehicle is driven on a predetermined snowy road, and a test driver performs sensory evaluation regarding traction characteristics. Results of the evaluation are expressed as index values and evaluated with the Conventional Example being assigned as the reference (100). In this evaluation, larger values are preferable. Additionally, a numerical value of 98 or larger indicates that the performance is properly ensured.

(2) In the evaluation of wear resistance performance, after the test vehicle travels 8000 km on a predetermined offload course, the degree of wear is observed and an index evaluation is performed. Results of the evaluation are expressed as index values and evaluated with the Conventional Example being assigned as the reference (100). In this evaluation, larger values are preferable.

(3) In the evaluation of uneven wear resistance performance, the amount of heel and toe wear of the blocks is measured after the test vehicle travels 8000 km. The measurement results are expressed as index values and evaluated with the Conventional Example being assigned as the reference (100). In this index evaluation, larger values are more preferable.

The test tires according to Examples have the configuration in FIGS. 1 and 2 and include the pair of circumferential main grooves 2A, 2B having a zigzag shape, the pair of shoulder land portions 31A, 31B, and the single center land portion 32. Additionally, the tire ground contact width TW is 222 mm, and the maximum ground contact width Wb2 of the center land portion 32 is 108 mm. In addition, each of the circumferential main grooves 2A, 2B has a groove width of 14.0 mm and a groove depth Hg of 14.6 mm. Additionally, each of the inclined lug grooves 321A, 321B has a groove width of 10.4 mm, and each of the lateral grooves 322A, 322B and the auxiliary grooves 323A, 323B has a groove width of 4.0 mm.

The test tires according to Conventional Example correspond to the test tires according to Example 1 in which the inclined lug grooves 321A, 321B extend through the center land portion 32 and open to the left and right circumferential main grooves 2A, 2B. Thus, the center land portion 32 does not include the lateral grooves 322A, 322B (or each of the lateral grooves 322A, 322B has the same groove depth as that of each of the inclined lug grooves 321A, 321B, thus forming a portion of each of the inclined lug grooves 321A, 321B).

As can be seen from the test results, the snow performance, wear resistance performance, and uneven wear resistance performance of the tire is improved in the test tires according to Examples.

The invention claimed is:

1. A pneumatic tire comprising: first and second circumferential main grooves extending in a tire circumferential direction; and a pair of shoulder land portions and one row of a center land portion defined by the first and second circumferential main grooves,
   the center land portion comprising: first and second inclined lug grooves extending at an incline with respect to the tire circumferential direction; a pair of first center blocks defined by the first and second inclined lug grooves and disposed adjacent in a tire lateral direction; and two or more second center blocks defined by the first and second inclined lug grooves and disposed adjacent in the tire lateral direction,
   the pair of first center blocks and the two or more second center blocks being alternately arranged in the tire circumferential direction to form a block row of the center land portion, and
   the block row of the center land portion being obtained by coupling in a row in the tire circumferential direction and in a zigzag shape via coupling grooves each comprising a groove bottom portion shallower than the first and second inclined lug grooves; wherein
   the pair of first center blocks are coupled together via a first coupling groove of the coupling grooves, the two or more second center blocks are coupled together via a second coupling groove of the coupling grooves, and a first center block included in the first center blocks and defined by the first circumferential main groove is coupled, via a third coupling groove of the coupling grooves, to a second center block included in the second center blocks and defined by the first circumferential main groove, forming a first block unit, and
   the second center block that is included in the second center blocks forming the first block unit and that is defined by the second circumferential main groove is coupled, via a fourth coupling groove of the coupling grooves, to the first center block that is included in the pair of first center blocks forming a second block unit different from the first block unit and that is defined by the second circumferential main groove, coupling adjacent block units together.

2. The pneumatic tire according to claim 1, wherein in a tread plan view, an imaginary line Lc1 extending through a center of gravity of the first center blocks and an imaginary line Lc2 extending through a center of gravity of the second center blocks are inclined in a same direction with respect to the tire circumferential direction.

3. The pneumatic tire according to claim 2, wherein an inclination angle $\varphi 1$ of the imaginary line Lc1 of the first center blocks and an inclination angle $\varphi 2$ of the imaginary line Lc2 of the second center blocks, with respect to the tire circumferential direction, are in ranges of 15 deg.$\leq \varphi 1 \leq$65 deg. and 15 deg.$\leq \varphi 2 \leq$65 deg.

4. The pneumatic tire according to claim 3, wherein the inclination angle $\varphi 1$ of the imaginary line Lc1 and the inclination angle $\varphi 2$ of the imaginary line Lc2 have a relationship of $\varphi 2 < \varphi 1$ and 5 deg.$\leq \varphi 1 - \varphi 2 \leq$30 deg.

5. The pneumatic tire according to claim 1, wherein a minimum distance Hb from a tread contact surface to the groove bottom portion of each of the coupling grooves has a relationship with a maximum groove depth H1 of the first inclined lug groove represented by $0.70 \leq Hb/H1 \leq 0.90$.

6. The pneumatic tire according to claim 5, wherein the coupling grooves have a partial raised bottom portion that satisfies conditions for the minimum distance Hb, and a length Lb of the raised bottom portion has a relationship with a groove length Lc of the coupling groove represented by $0.50 \leq Lb/Lc$.

7. The pneumatic tire according to claim 1, wherein a maximum groove depth H1 of the first inclined lug grooves has a relationship with a maximum groove depth Hg of the first circumferential main groove represented by $0.80 \leq H1/Hg \leq 1.00$.

8. The pneumatic tire according to claim 1, wherein
   a first inclined lug groove included in the first inclined lug grooves opens, at one end portion, to the first circumferential main groove and terminates, at another end portion, within the center land portion, a second inclined lug groove included in the second inclined lug grooves extends at an incline in a same direction as the first inclined lug groove and opens, at one end portion, to the second circumferential main groove and terminates, at another end portion, within the center land portion, the coupling grooves comprise:

a first lateral groove connecting the first inclined lug groove with the second circumferential main groove;

a second lateral groove connecting the second inclined lug groove with the first circumferential main groove; and first and second auxiliary grooves connecting the first inclined lug groove with the second inclined lug groove adjacent to each other, the first inclined lug groove and the first lateral groove and the second inclined lug groove and the second lateral groove are alternately arranged in the tire circumferential direction to define the first center block and the second center block, the first auxiliary groove defines the pair of first center blocks, and the second auxiliary groove defines the two or more second center blocks.

9. The pneumatic tire according to claim 8, wherein the pair of first center blocks are disposed on an extension line of the first and second inclined lug grooves.

10. The pneumatic tire according to claim 8, wherein an inclination angle $\theta2$ of the first lateral groove with respect to the tire circumferential direction is in a range of 80 deg.$\leq\theta2\leq$120 deg.

11. The pneumatic tire according to claim 8, wherein inclination angles $\theta3A$, $\theta3B$ of the first and second auxiliary grooves are in ranges of 10 deg.$\leq\theta3A\leq$30 deg. and 30 deg.$\leq\theta3B\leq$85 deg.

12. The pneumatic tire according to claim 1, wherein a maximum width Lb2 of the first center blocks has a relationship with a tire ground contact width TW represented by 0.10$\leq$Lb2/TW$\leq$0.50.

13. The pneumatic tire according to claim 1, wherein a maximum ground contact width Wb2 of the center land portion with respect to a tire ground contact width TW is in a range of 0.30$\leq$Wb2/TW$\leq$0.60.

14. The pneumatic tire according to claim 1, wherein
the first and second circumferential main grooves have a zigzag shape with an amplitude in the tire lateral direction, and
the pair of shoulder land portions and the center land portion are disposed overlapping each other in the tire circumferential direction.

* * * * *